(12) United States Patent
Staud et al.

(10) Patent No.: US 10,252,198 B2
(45) Date of Patent: Apr. 9, 2019

(54) FILTER DEVICE FOR A BEVERAGE AND/OR ICE DISPENSER UNIT OF A HOUSEHOLD COOLING APPLIANCE AND HOUSEHOLD APPLIANCE HAVING A FILTER DEVICE

(71) Applicant: BSH HAUSGERAETE GMBH, Munich (DE)

(72) Inventors: Ralph Staud, Munich (DE); Thomas Tischer, Haar (DE); Marco Reitwiessner, Munich (DE); Andreas Kessler, Munich (DE); Graham Sadtler, Huntington Beach, CA (US); Heather Kamper, Newport Beach, CA (US); Frank Altmannsberger, Giengen (DE); Eugen Gaplikow, Bubesheim (DE); Karl-Friedrich Laible, Langenau (DE)

(73) Assignee: BSH Hausgeraete GmbH, Munich (DE)

( * ) Notice: Subject to any disclaimer, the term of this patent is extended or adjusted under 35 U.S.C. 154(b) by 93 days.

(21) Appl. No.: 15/447,883

(22) Filed: Mar. 2, 2017

(65) Prior Publication Data
US 2018/0250618 A1  Sep. 6, 2018

(51) Int. Cl.
*B01D 35/30* (2006.01)
*B67D 1/00* (2006.01)
*F25D 23/02* (2006.01)
*F25D 23/12* (2006.01)
*F25C 5/20* (2018.01)

(52) U.S. Cl.
CPC ......... *B01D 35/306* (2013.01); *B67D 1/0014* (2013.01); *F25C 5/22* (2018.01); *F25D 23/028* (2013.01); *F25D 23/126* (2013.01); *B01D 2201/301* (2013.01); *B01D 2201/36* (2013.01); *B67D 2210/0001* (2013.01); *F25D 2323/121* (2013.01)

(58) Field of Classification Search
CPC .............. B01D 35/306; B01D 2201/36; B01D 2201/301; F25C 5/22; F25D 23/028; B67D 1/0014; B67D 2210/0001
USPC .......... 210/236, 232, 444, 282; 62/318, 338, 62/339, 389
See application file for complete search history.

(56) References Cited

U.S. PATENT DOCUMENTS 7,056,435 B2    6/2006  Jenkins et al.
2016/0075566 A1* 3/2016  Froelicher .............. B01D 35/30
                                                 210/236

* cited by examiner

*Primary Examiner* — Madeline Gonzalez
(74) *Attorney, Agent, or Firm* — Laurence A. Greenberg; Werner H. Stemer; Ralph E. Locher

(57) ABSTRACT

A filter device for a beverage and/or ice dispenser unit of a household cooling appliance includes a cartridge head which is specifically pivotable. A household cooling appliance with a filter device is also provided.

17 Claims, 5 Drawing Sheets

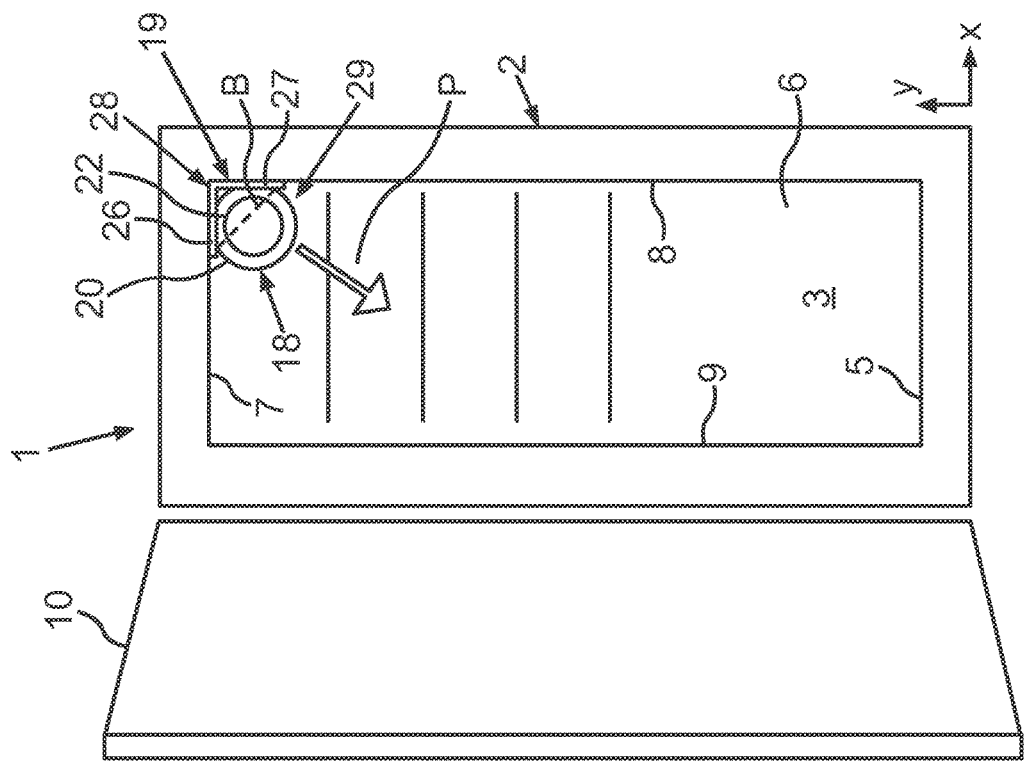
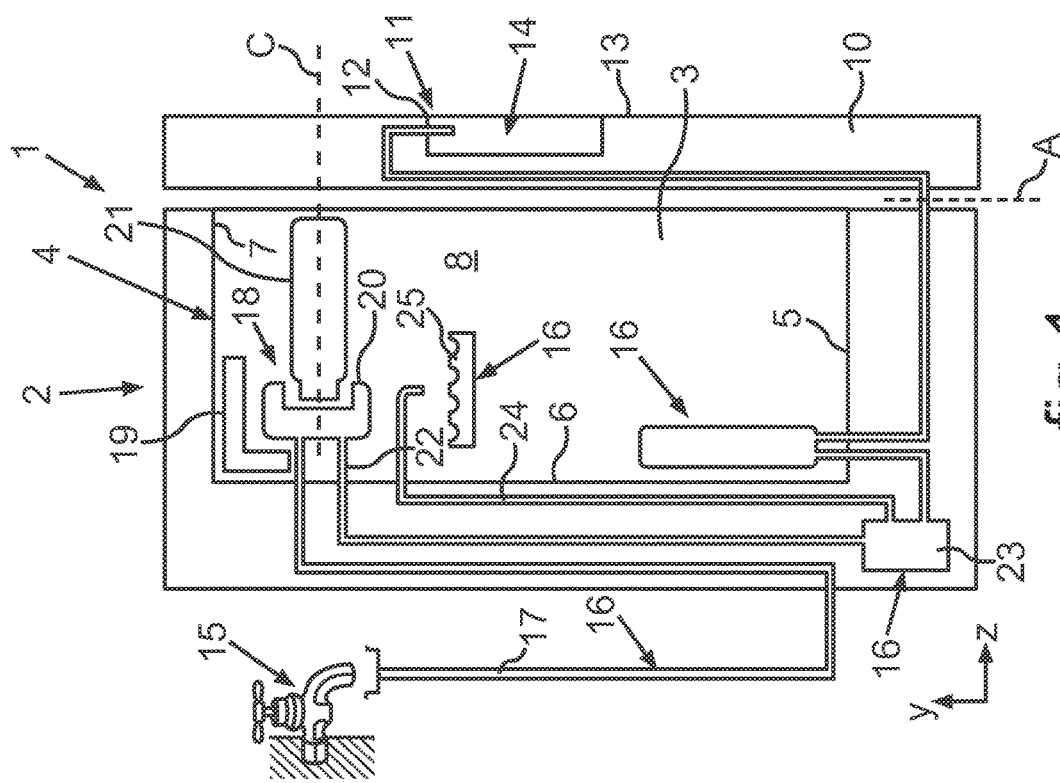
fig. 1
fig. 2

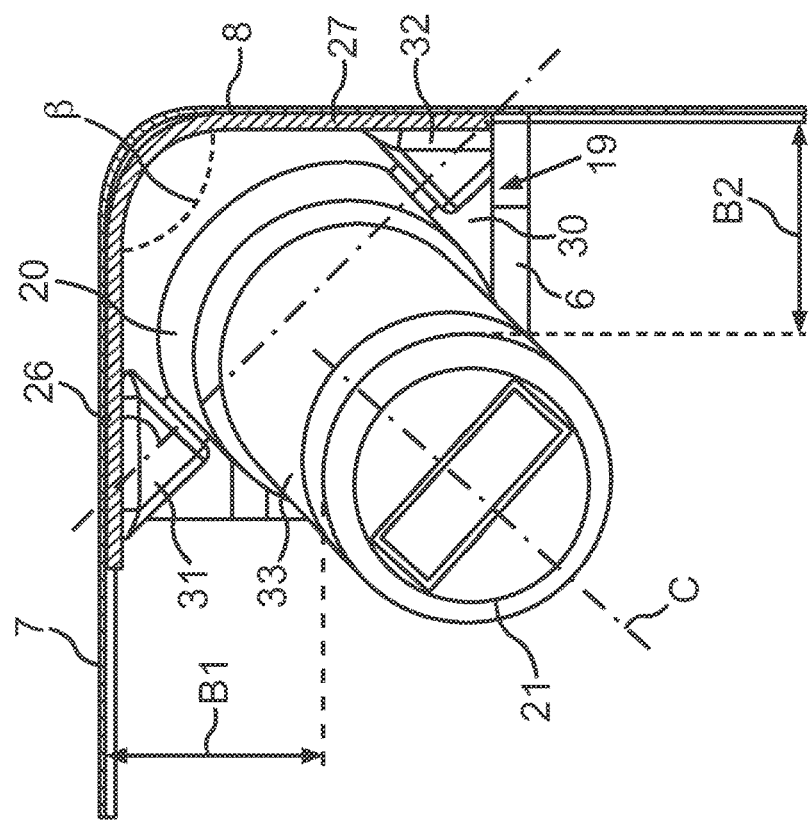
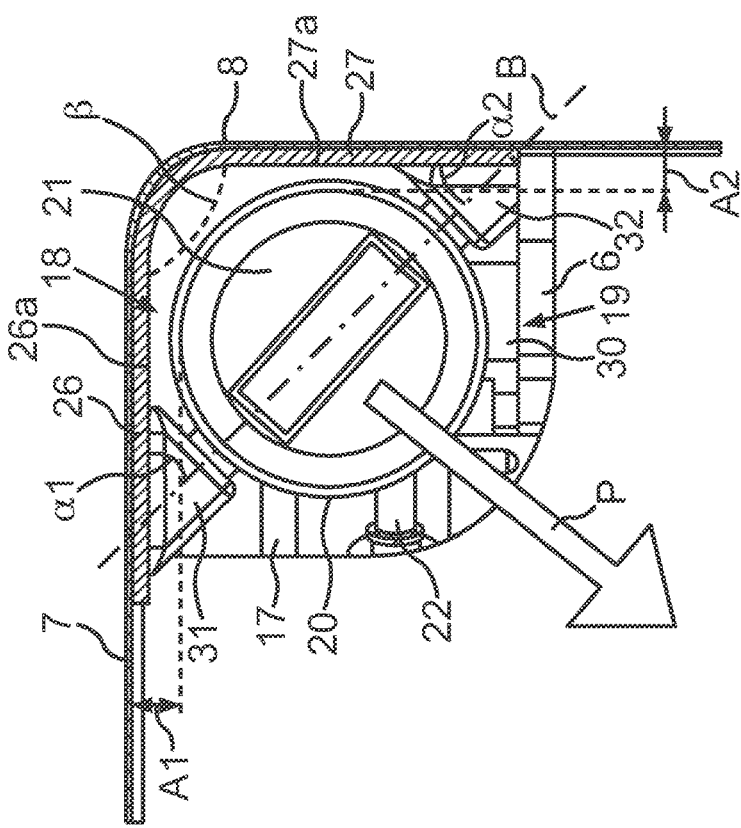

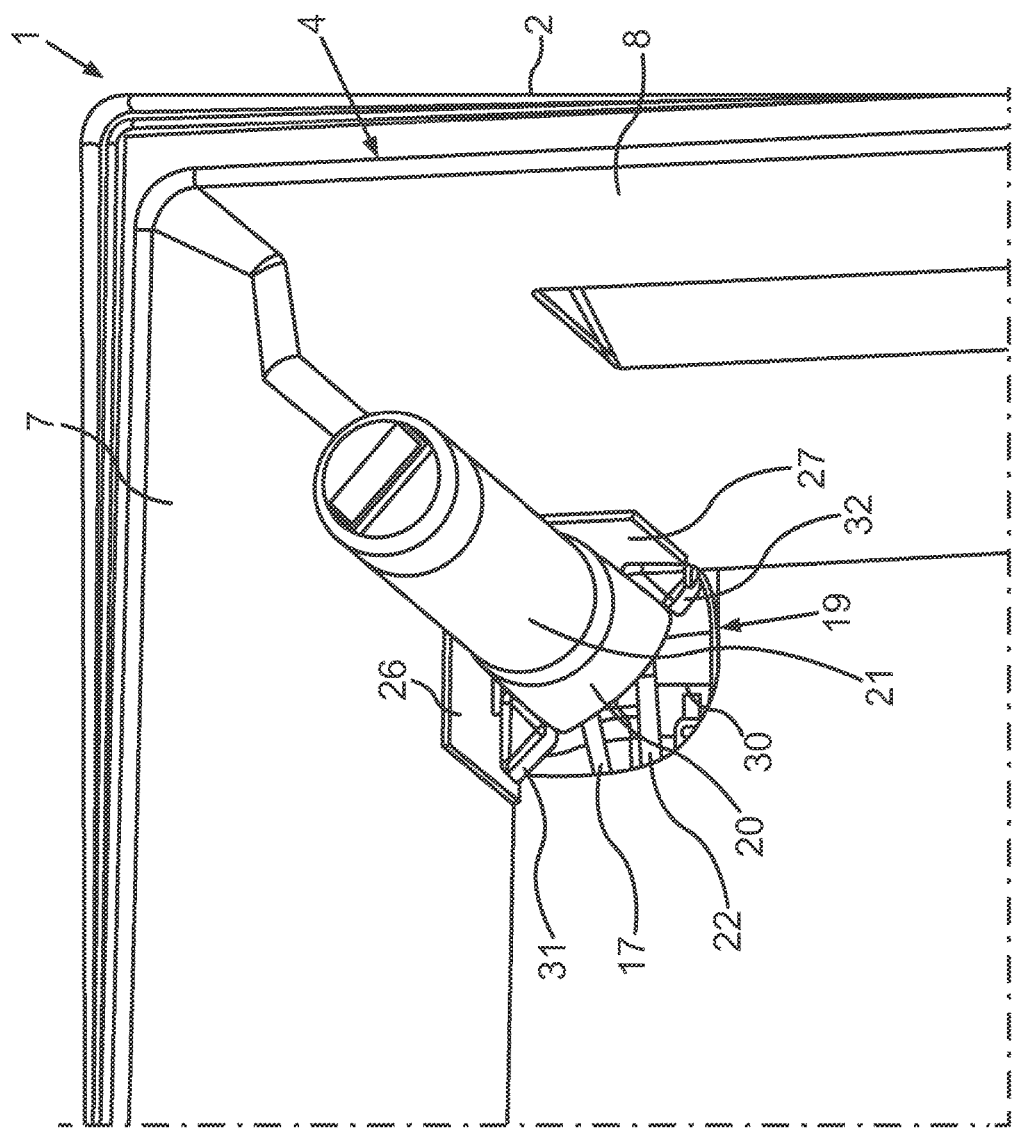

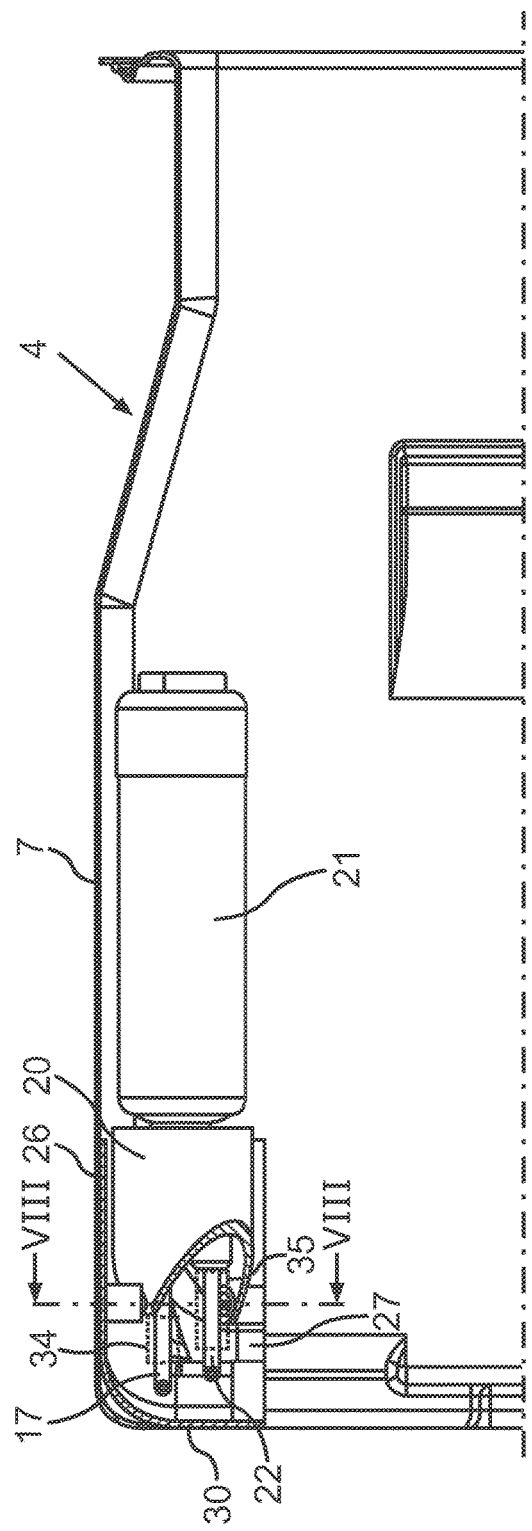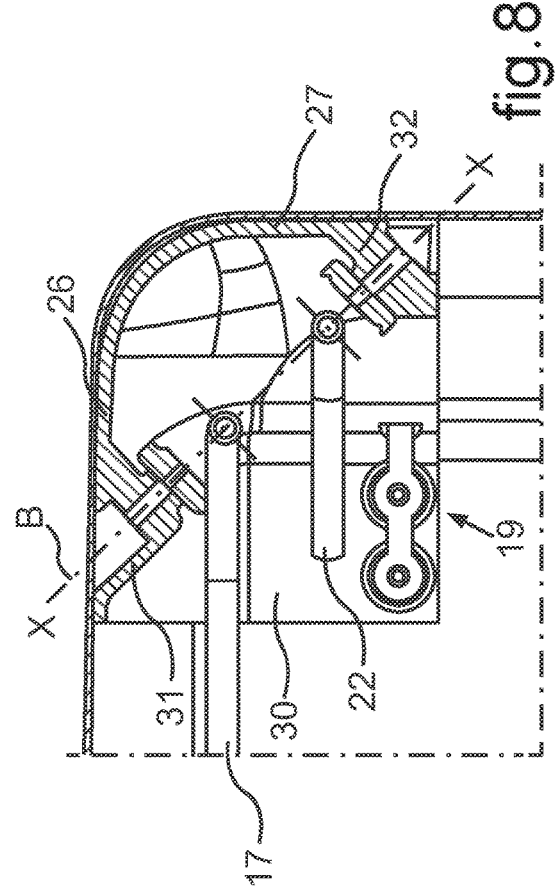

FILTER DEVICE FOR A BEVERAGE AND/OR ICE DISPENSER UNIT OF A HOUSEHOLD COOLING APPLIANCE AND HOUSEHOLD APPLIANCE HAVING A FILTER DEVICE

BACKGROUND OF THE INVENTION

Field of the Invention

The invention relates to filter devices for a beverage and/or ice dispenser unit of a household cooling appliance. The invention also relates to a household cooling appliance with a filter device for a beverage and/or ice dispenser unit of this household cooling appliance.

In the case of a household cooling appliance for storing food it is known that these commonly include a receiving space for food, which for instance can be a cooling compartment. A household cooling appliance can also include a so-called dispenser unit, which represents a beverage and/or ice dispenser unit. By such a unit a beverage can be generated and/or ice form elements can be generated, which then can be dispensed via an outlet on the household cooling appliance. Commonly such a household cooling appliance then is connected with an external water network, via which the water is supplied to the household cooling appliance. This water then is supplied via a line system to the household cooling appliance of the beverage and/or ice dispenser unit, wherein then this water is used for generating the ice form elements or is used as an extra to the beverage to be generated.

In this connection it is also known that in the household cooling appliance a filter device is disposed, through which the externally supplied water flows and accordingly is then also filtered. Such a filter device thus is a component, which also requires corresponding space. It includes a filter cartridge that needs to be exchanged from time to time.

U.S. Pat. No. 7,056,435 B2 discloses a household cooling appliance, which includes a corresponding filter device. The filter device is disposed on a ceiling of the household cooling appliance. This filter device is constructed to be so complex and has an envelope, which is jaw-shaped and thus can be opened and shut as jaw. In this envelope the filter cartridge is disposed. In the opened state the filter cartridge can then be taken out. In this known filter device the configuration is such that for opening the envelope same, however, can only be pivoted about a horizontal axis. Thereby accessibility is rendered more difficult and on the other hand the filter device needs to be positioned within the household cooling appliance in such a way that accessibility of the filter cartridge is facilitated, which in the case of the only provided option for opening the envelope leads to it that the filter device needs to be positioned relatively freely accessible and spaced far from the lateral walls of the household cooling appliance.

SUMMARY OF THE INVENTION

It is accordingly an object of the present invention to generate a filter device for a beverage and/or ice dispenser unit of a household cooling appliance, in which its configuration within the household cooling appliance is facilitated to require little space while the exchange of a filter cartridge can still be performed in a simple and user-friendly way. Equally the object is to provide a household cooling appliance with a filter device.

These objects are accomplished by filter devices and household cooling appliances according to the invention.

An aspect of the invention relates to a filter device for a beverage and/or ice dispenser unit of the household cooling appliance, wherein the filter device is configured for filtering liquid. The filter device has a carrier part for attaching the filter device to a component of the household cooling appliance. The carrier part includes a first wall. The first wall is configured in particular to be in contact with a first wall of the component of the household cooling appliance. The carrier part includes a second wall. The second wall is in particular configured to be in contact with a second wall of the component of the household cooling appliance. The first wall of the carrier part and the second wall of the carrier part are disposed to be inclined towards each other. The filter device includes a cartridge head, which is configured to receive a filter cartridge. The filter device includes a pivoting device, by which the cartridge head is disposed on the carrier part to be pivotable about a pivot axis.

The pivot axis extends diagonally between the first wall and the second wall of the carrier part.

A further aspect of the invention relates to a filter device for a beverage and/or ice dispenser unit of a household cooling appliance, wherein the filter device is configured for filtering liquid. The filtering device includes a carrier part for attaching the filter device to a component of the household cooling appliance. The carrier part includes a first wall. The first wall is configured in particular to be in contact with a first wall of the component of the household cooling appliance. The carrier part includes a second wall. The second wall is configured in particular to be in contact with a second wall of the component of the household cooling appliance. The first wall of the carrier part and the second wall of the carrier part are disposed to be inclined towards each other. The filter device includes a cartridge head, which is configured for receiving a filter cartridge. The filter device includes a pivoting device, by which the cartridge head is disposed on the carrier part to be pivotable about a pivot axis. The pivot axis is oriented at a first angle smaller than 90° relative to the first wall of the carrier part and at a second angle smaller than 90° relative to the second wall.

A further aspect of the invention relates to a filter device for a beverage and/or ice dispenser unit of a household cooling appliance, wherein the filter device is configured for filtering liquid. The filter device includes a carrier part for attaching the filter device to a component of the household cooling appliance. The carrier part has a first wall. The first wall is in particular configured to be in contact with a first wall of the component of the household cooling appliance. The carrier part has a second wall. The second wall is configured in particular to be in contact with a second wall of the component of the household cooling appliance. The first wall of the carrier part and the second wall of the carrier part are disposed to be inclined towards each other. The filter device includes a cartridge head, which is configured to receive a filter cartridge. The filter device includes a pivoting device, by which the cartridge head is disposed to be pivotable about a pivot axis. The pivoting device is configured in such a way that the cartridge head is capable of being positioned in a first position relative to the carrier part and in a second position relative to the carrier part that is different therefrom. The cartridge head in this first position has a first distance from the first wall of the carrier part and has a first distance from the second wall of the carrier part. The cartridge head in this second position has a second distance from the first wall of the carrier part that is larger in comparison with the first distance from the first wall of the carrier part, and in this second position has a second distance from the second wall of the carrier part that is larger than the first distance from the second wall of the carrier part.

A further aspect of the invention relates to a household cooling appliance, which includes a housing, in which a receiving space for food is formed. The household cooling appliance has an inner container having walls, wherein by the walls of the inner container the receiving space is bounded. By two walls of the inner container that lead into each other a corner portion is formed. The household cooling appliance includes a beverage and/or ice dispenser unit, which is configured for dispensing a beverage and/or ice form elements. Such a unit is also referred to as dispenser unit. The beverage and/or ice dispenser unit is also configured to generate the beverage and/or the ice form elements. The household cooling appliance has a filter device, which is configured for filtering a liquid. The filtered liquid is capable of being supplied to the beverage and/or ice dispenser unit for generating the beverage and/or the ice form elements. The filter device includes a cartridge head, which is configured for receiving a filter cartridge. The cartridge head is disposed to be pivotable about a pivot axis of the filter device. The filter device is disposed in this corner portion formed by the walls. The pivot axis is diagonally disposed between these walls forming this corner portion.

A further aspect of the invention relates to a household cooling appliance, which includes a housing, in which a receiving space for food is formed. The household cooling appliance has an inner container, which includes walls, wherein by the walls of the inner container the receiving space is bounded. By two walls of the inner container that lead into each other a corner portion is formed. The household cooling appliance has a beverage and/or ice dispenser unit, which is configured for dispensing a beverage and/or ice form elements. Such a unit is also referred to as dispenser unit. The beverage and/or ice dispenser unit is also configured for generating the beverage and/or the ice form elements. The household cooling appliance includes a filter device, which is configured for filtering a liquid. The filtered liquid is capable of being supplied to the beverage and/or ice dispenser unit for generating the beverage and/or the ice form elements. The filter device includes a carrier part for attaching the filter device to a component of the household cooling appliance. The carrier part has a first wall. The first wall is in particular configured to be in contact with a first wall of the component of the household cooling appliance. The carrier part has a second wall. The second wall is configured in particular to be in contact with a second wall of the component of the household cooling appliance. The first wall of the carrier part and the second wall of the carrier part are disposed to be inclined towards each other. The filter device includes a cartridge head, which is configured for receiving a filter cartridge. The filter device has a pivoting device, by which the cartridge head is disposed on the carrier part to be pivotable about a pivot axis. The pivot axis extends diagonally between the first wall and the second wall of the carrier part.

A further aspect of the invention relates to a household cooling appliance, which includes a housing, in which a receiving space for food is formed. The household cooling appliance includes an inner container, which has walls, wherein by the walls of the inner container the receiving space is bounded. By two walls of the inner container that lead into each other a corner portion is formed. The household cooling appliance has a beverage and/or ice dispenser unit, which is configured for dispensing a beverage and/or ice form elements. Such unit is also referred to as dispenser unit. The beverage and/or ice dispenser unit is also configured for generating a beverage and/or the ice form elements. The household cooling appliance includes a filter device, which is configured for filtering a liquid. The filtered liquid is capable of being supplied to the beverage and/or ice dispenser unit for generating the beverage and/or the ice form element. The filter device has a carrier part for attaching the filter device to a component of the household cooling appliance. The carrier part has a first wall. The first wall is in particular configured to be in contact with a first wall of the component of the household cooling appliance. The carrier part has a second wall. The second wall is configured in particular to be in contact with a second wall of the component of the household cooling appliance. The first wall of the carrier part and the second wall of the carrier part are disposed to be inclined towards each other. The filter device includes a cartridge head, which is configured for receiving a filter cartridge. The filter cartridge includes a pivoting device, by which the cartridge head is disposed on the carrier part to be pivotable about a pivot axis. The pivot axis is oriented at a first angle smaller than 90° relative to the first wall of the carrier part and at a second angle smaller than 90° relative to the second wall.

A further aspect of the invention relates to a household cooling appliance, which includes a housing, in which a receiving space for food is formed. The household cooling appliance includes an inner container, which has walls, wherein by the walls of the inner container the receiving space is bounded. By two walls of the inner container leading into each other a corner portion is formed. The household cooling appliance has a beverage and/or ice dispenser unit, which is configured for dispensing a beverage and/or ice form elements. Such a unit is also referred to as dispenser unit. The beverage and/or ice dispenser unit is also configured for generating the beverage and/or the ice form elements. The household cooling appliance includes a filter device, which is configured for filtering a liquid. The filtered liquid is capable of being supplied to the beverage and/or ice dispenser unit for generating the beverage and/or the ice form elements. The filter device includes a carrier part for attaching the filter device to a component of the household cooling appliance. The carrier part has a first wall. The first wall is in particular configured to be in contact with a first wall of the component of the household cooling appliance. The carrier part has a second wall. The second wall is in particular configured to be in contact with a second wall of the component of the household cooling appliance. The first wall of the carrier part and the second wall of the carrier part are configured to be inclined towards each other. The filter device includes a cartridge head, which is configured for receiving a filter cartridge. The filter device includes a pivoting device, by which the cartridge head is disposed to be pivotable about a pivot axis on the carrier part. The pivoting device is configured in such a way that the cartridge head is capable of being positioned in a first position relative to the carrier part and in a second position relative to the carrier part that is different therefrom. The cartridge head in this first position has a first distance from the first wall of the carrier part and has a first distance from the second wall of the carrier part. The cartridge head in this second position has a second distance from the first wall of the carrier part that is larger in comparison with the first distance from the first wall of the carrier part, and in this second position has a second distance from the second wall of the carrier part that is than the first distance from the second wall of the carrier part.

By these aspects of the invention the configuration of the filter device within the household cooling appliance is facilitated in a space-saving way and the exchange of a filter cartridge can be performed in a simple and user-friendly manner.

By the indications "top", "bottom", "front", "rear", "horizontal", "vertical", "depth direction", "width direction", "height direction" etc. the positions and orientations for an intended use and intended configuration of the ice preparator bowl or the device are indicated.

Further features of the invention derive from the claims, the figures, and the description of the figures. The features and feature combinations previously mentioned in the description as well as the features and feature combinations named in the following in the description of the figures and/or shown in the figures alone can be used not only in the respectively indicated combination, but also in any other combination, without leaving the scope of the invention. Thus also embodiments are to be considered as included or disclosed by the invention, which are not explicitly shown and explained in the figures, however, derive through separated feature combinations from the explained embodiments and are generable therefrom. Also embodiments and feature combinations are to be considered as being disclosed, which thus do not include all features of an originally formulated independent claim. Moreover, embodiments and feature combinations are to be considered as being disclosed, in particular by the above set out embodiments, which go beyond the feature combinations set out in the back-references of the claims or deviate from them.

Other features which are considered as characteristic for the invention are set forth in the appended claims.

Although the invention is illustrated and described herein as embodied in a filter device for a beverage and/or ice dispenser unit of a household cooling appliance and a household appliance having a filter device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a diagrammatic, sectional view of an embodiment of a household cooling appliance;

FIG. 2 is a diagrammatic, front view of the household cooling appliance according to FIG. 1;

FIG. 3 is an enlarged view of a partial portion in FIG. 2, in which a cartridge head and a filter cartridge are shown in a first position;

FIG. 4 is an enlarged representation of a partial portion in FIG. 2, in which a cartridge head and a filter cartridge are shown in a second position;

FIG. 6 is a perspective view of the components in FIG. 3;

FIG. 7 is a lateral view of the components according to FIG. 3 and FIG. 6; and

FIG. 8 is a sectional view of the presentation in FIG. 7 in a front view.

DETAILED DESCRIPTION OF THE INVENTION

Figure 5:
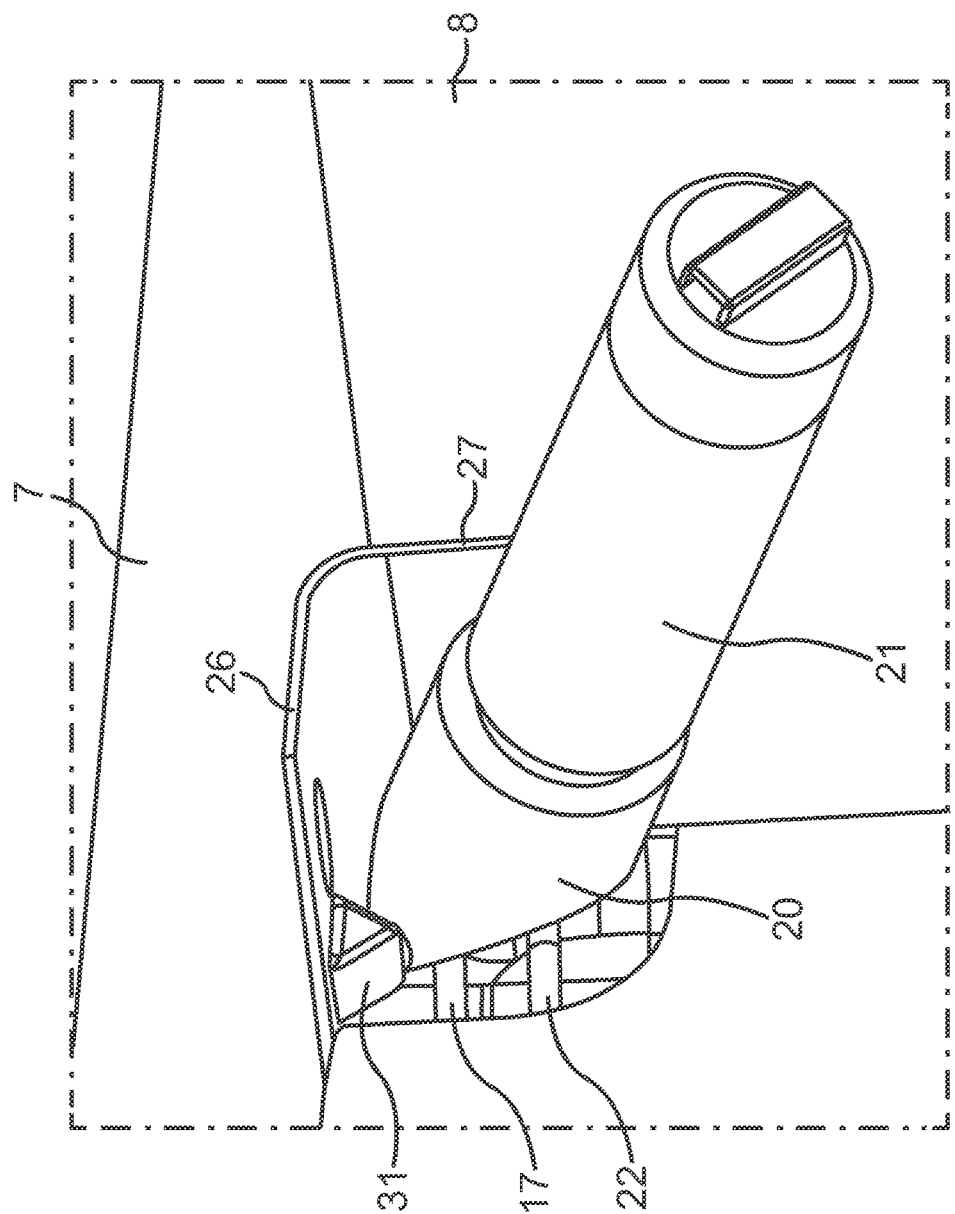
FIG. 5 is a perspective view of the components in FIG. 4.

Referring now in detail to the figures of the drawings, in which figures identical or functionally identical elements are equipped with the same reference signs, and first, particularly, to FIG. 1 thereof, there is seen a simplified diagrammatic sectional view a household cooling appliance 1, which is configured for storing and preserving food. The household cooling appliance 1 includes a housing 2, in which at least one receiving space 3 for food is configured. This receiving space 3 is preferably a cooling compartment. The household cooling appliance 1 moreover can also have one further receiving space, which can for instance be a freezer compartment.

The household cooling appliance 1 has an inner container 4, which by walls bounds the receiving space 3. In FIG. 1 a bottom wall 5, a rear wall 6, and a ceiling wall 7 is shown. Moreover a side wall 8 and a side wall 9 (FIG. 2) is to be allocated with the inner container 4.

The inner container 4 is disposed within the housing 2.

The household cooling appliance 1 moreover includes a door 10, which is disposed for front side closure of the receiving space 3. The door 10 is in particular disposed on the housing 2, in particular disposed to be pivotable. A pivot axis A is oriented in the height direction and thus in the y direction of the household cooling appliance 1.

The household cooling appliance 1 in an advantageous embodiment includes a dispenser unit, which is a beverage and/or ice dispenser unit 11. This beverage and/or ice dispenser unit is configured for dispensing a beverage and/or ice form elements, such as ice cubes or crushed ice. This also means that the beverage and/or ice dispenser unit 11 is configured for generating the beverage and/or the ice form elements. The beverage and/or ice dispenser unit 11 includes a dispenser unit 12, via which the beverage and/or the ice form elements can be dispensed. For this purpose on the front side 13 of the door 10 a niche 14 is configured, into which a receiving vessel can be inserted, into which then the dispensed beverage and/or the ice form elements can be inserted. This niche 14 is accessible on the front side and the beverage and/or the ice form elements can also be dispensed with the door 10 being closed.

The household cooling appliance 1 is connected to an external water network 15. The household cooling appliance 1 has a water-conducting system 16, to which a multitude of functional units and lines belong and by means of which the water supplied by the water network 15 is conducted and processed within the household cooling appliance 1, in order to then be able to be made available to the beverage and/or ice dispenser unit 11.

The line 17 coming in particular directly from the water network 15 leads to a filter device 18 of the household cooling appliance 1. With the filter device 18 the water supplied from the water network 15 is filtered, in order to be able to then be provided after the filtering for the generation of the ice form elements and/or for instance also to be conducted into a container, in which then the filtered water is provided for the generation also of a beverage.

The filter device 18 in the shown embodiment includes in particular a carrier part 19. The filter device 18 in a further advantageous embodiment includes a cartridge head 20. The cartridge head 20 is disposed on the carrier part 19 to be capable of being moved.

In the shown embodiment moreover a filter cartridge 21 is shown, which is inserted into the cartridge head. For instance this attachment can be configured by a bayonet joint. In the state, in which the filter cartridge 21 is mounted on the cartridge head 20, the filter cartridge 21 is motion-coupled with this cartridge head 20.

The filter cartridge 21 is disposed to be non-destructively releasable on the cartridge head 20 so that it also can be exchanged.

The line 17 directly leads into the cartridge head 20. This line 17 is an inlet hose, which conducts the water from the water network 15 to the filter cartridge 21. Moreover, a further line 22 is shown, which leads from the cartridge head 20 to a container 23 of the water-conducting system 16. The water filtered through the filter cartridge 21 is conducted from the filter device 18 via this line 22 to this container 23.

From there it can then be supplied via a further line 24 to an ice preparator 25, which in particular is integral part of the beverage and/or ice dispenser unit 11, wherein in the ice preparator 25 then the ice form elements are generated.

In an advantageous embodiment the carrier part 19 is configured as attachment part. With this carrier part 19 the entire filter device 18 can be disposed on a component of the household cooling appliance 1. Such component of the household cooling appliance 1 can be at least one wall of the inner container 4. Preferably the carrier part 19 is configured such that the filter device 8 can be attached on at least two different walls of the inner container 4 or is disposed to be at least in contact with each of them.

The carrier part 19, as this is shown in the schematic front view of the household cooling appliance 1 according to FIG. 2, can include two walls, namely a first wall 26 and a second wall 27. In particular in an advantageous embodiment of these two walls 26 and 27 in a position, in which they are inclined towards each other, in particular at an angle of between 85° and 95°, preferably 90°. Preferably, these walls 26 and 27 of the carrier part 19 lead into each other, as this is shown in FIG. 2 in an exemplary embodiment. The walls 26 and 27 are in particular also configured as contact walls for contacting the walls of the component, in particular the inner container 4.

In particularly advantageous way the filter device 18 is disposed in a corner portion 28 in the receiving space 3. In particular this positioning of the filter device 18 is disposed in a top corner portion 28. In the shown advantageous embodiment the corner portion 28 in the case of this front view of the household cooling appliance 1 the right top corner portion is shown, which is advantageous in particular, if the door 10 relative thereto is disposed on the housing 2 to be pivotable towards the left side. By such a positioning of the filter device 18 same can be disposed within the receiving space 3 in a very space-saving way and then is positioned to be least interfering with respect thereto.

The filter device 18 further has a pivoting device 29. By means of this pivoting device 29 the cartridge head 20 is pivotable relative to the carrier part 19, wherein the cartridge head 20 is disposed on this carrier part 19. A pivot axis B of this pivoting device 29 in an advantageous embodiment is disposed diagonally between the first wall 26 and the second wall 27. This pivot axis B thus extends diagonally between these walls 26 and 27 of the carrier part 19.

In the embodiment in FIG. 2 this also means that this pivot axis B is oriented not to be in parallel to a space direction of the household cooling appliance 1 and thus not in parallel to the height direction and also not in parallel to the width direction (x direction). By such a configuration the cartridge head 20 with the filter cartridge 21 can be pivoted in a direction that is represented by the arrow P. This means that quasi a slanted pivoting of this cartridge head 20 from top diagonally towards the bottom in the receiving space 3 is performed.

By such a construction on the one hand the filter device 18 can be positioned in a first position, in which the cartridge head 20 is disposed in an operation position, in a very space-saving position maximally approaching the two walls, which are inclined towards each other, in particular the walls 7 and 8 of the inner container 4, on the other hand then in the pivoted state, in which a second position of the cartridge head 20 and thus also the filter cartridge 21 has been assumed, a very user-friendly and comprehensive accessibility of the filter cartridge 21 can be achieved. The filter cartridge 21 in this second position can then be grasped by a hand of a user in order to be able to achieve a simple handling in this regard by a rotational movement, which in particular is required for releasing a bayonet locking.

In FIG. 3 an enlarged presentation of the partial portion of the household cooling appliance 1 is shown, in which the filtering device 18 is disposed. In FIG. 3 in this connection the first position is shown, which is also an operating position. As can be seen in FIG. 3, the two walls 26 and 27 of the carrier part 19 are in large-area contact with the ceiling wall 7 and the side wall 8 of the inner container 4 as contact walls and support walls.

Preferably it may be envisaged that the carrier part 19 includes a further wall 30, which represents a rear wall. In particular it is advantageous, if this rear wall 30 is in contact with the rear wall 6 of the inner container 4. This rear wall 30 of the carrier part 19 leads into the first wall 26 and the second wall 27. By these three walls 26, 27, and 30 then also a bowl-shaped carrier body is formed as carrier part 19, in which the cartridge head 20 is received. Thereby same is also disposed to be protected. The carrier part 19 by such a construction with the named walls and their positioning relative to each other also mechanically is very stable and thus in particular also torsion-resistant. Thereby it can also receive the cartridge head 20 with the filter cartridge 21 in a stable way and also when moving the cartridge head 20 with the filter cartridge 21 no undesired deformations of the carrier part 19 occur.

As moreover can be discerned in FIG. 3, the carrier part 19 in an advantageous embodiment on an interior side 26a includes a raised base 31. This base 31 represents a coupling dome for the cartridge head 20, which thus then is mounted rotatably spaced from the two walls 26 and 27 on this base 31.

In particular it is envisaged that also on the second wall 27 a raised base 32 is formed, which is constructed to be functionally corresponding to the first base 31. Also this second raised base 32 is configured on an inner side 27a of the second wall 27 of the carrier part 19. In particular these bases 31 and 32 are configured to be a single piece with the walls 26 and 27.

Preferably the carrier part 19 is configured to be integrally formed and in particular a plastic part.

In an advantageous embodiment the pivot axis B is oriented in such a way that it is disposed at a first angle $\alpha 1$ relative to the first wall 26, wherein this angle $\alpha 1$ is smaller 90°, in particular between 35° and 55°, in particular between 40° and 50°, preferably 45°.

In an advantageous embodiment moreover it is envisaged that the pivot axis B is disposed at a second angle $\alpha 2$, which is in particular smaller than 90°, relative to the second wall 27. Here, too, this second angle $\alpha 2$ preferably amounts to between 35° and 55°, in particular between 40° and 50°, preferably 45°.

Such orientation of the pivot axis B can also be configured independently of the first wall 26 and the second wall 27 with respect to the walls of the inner container 4, for instance relative to the ceiling wall 7 and to a vertical side wall 8. This can then be the case, if the carrier part 19 does not include the first wall 26 and/or the second wall 27.

For instance in such a construction it may be envisaged that the carrier part 19 for instance only includes a rear wall 19, on which then for instance the bases 31 and 32 are formed, which then are oriented in the depth direction (z-direction) towards the front and on which then the cartridge head 20 is disposed correspondingly to be mounted pivotably.

In a further advantageous embodiment it is envisaged that the cartridge head 20 and thus then also a filter cartridge 21 disposed thereon in this position shown in FIG. 3 is disposed at a first distance A1 from a first wall, in particular the ceiling wall 7, of the inner container 4. In particular in this first position the cartridge head 20 and thus then also the filter cartridge 21 is disposed at a first distance A2 from a further different wall, in particular the vertical side wall 8 of the inner container 4.

The pivoting device 29 is then preferably configured to have in the second position shown in FIG. 4, in which the cartridge head 20 with the filter cartridge 21 has been pivoted in the direction of the arrow P, a respectively larger distance. This means, as it is shown in FIG. 4, that in this second position the filter cartridge 21 has a second distance B1 from the first wall 26, wherein this second distance B1 is larger than the first distance A1. At the same time in this second position then also a second distance B2 from the second wall 27 is configured, which is larger than the first distance A2 from the vertical side wall 8 in the first position according to FIG. 3. In this second position according to the representation in FIG. 4 then the filter cartridge 21 at its jacket wall 33 can be easily gripped with a hand by a user and with a pivot movement be moved about a longitudinal axis C of the filter cartridge 21 locally relative to the cartridge head 20 and thus be released from the cartridge head 20.

Generally it is also possible in a further embodiment that the filter device 18 includes no carrier part 19. In such an embodiment it could be envisaged that the cartridge head 20 is disposed to be directly pivotable on the inner container 4. For instance then corresponding bases 31 and 32 could be integrally formed on the inner container 4, for instance on the ceiling wall 7 and the vertical side wall 8 and the cartridge head 20 be pivotably mounted thereon as component that is separate therefrom. Also in the case of such an embodiment in an advantageous way the pivot axis B then would be correspondingly oriented as it is envisaged in the representations according to FIG. 2 to FIG. 4.

In FIG. 5 in a perspective representation the filter device 18 is shown, wherein here according to the explanations as to FIG. 4 the cartridge head 20 and thus also the filter cartridge 21 are disposed in a second position and thus in the pivoted position. This second position then also characterizes an exchange position of the filter cartridge 21.

In FIG. 6 in a perspective representation of the cartridge head 20 and the filter cartridge 21 is shown in a first position, as it has already been explained in FIG. 3.

In FIG. 7 a side view is shown, in which the filter cartridge 21 and the cartridge head 20 are disposed in the first position.

In FIG. 8 a sectional view along the section line VIII-VIII in FIG. 7 is shown. Here it can also be discerned how the lines 17 and 22 are bent just before leading into the rear side of the cartridge head 20 and viewed in the depth direction of the household cooling appliance 1 are oriented towards the front and lead into this cartridge head 20. By such an orientation and by such an immediate vicinity of the portions of the lines 17 and 22 leading into the cartridge head 20 relative to the pivot axis B undesired deformations and expansions of the lines 17 and 22, which in particular represent deformable hoses, can be avoided when pivoting from the first position into the second position. In particular these hoses then are advantageously deformed during this movement in the direction of the arrow P in their neutral fibers. Undesired bucklings or reductions in cross section can thereby be avoided. Moreover over a long period of time also undesired predetermined buckling points, which could become brittle, can be avoided.

In an advantageous embodiment it may also be envisaged that the filter device 18 includes a first guiding element 34, which in FIG. 7 is shown merely in a broken line and symbolically. With this guiding element the first line 17 can be guided at least in the region where it leads into the cartridge head 20. The above-named advantages for the line 17 are thereby favored once more. In an advantageous embodiment it may also be envisaged that the filter device 18 has a second guiding element 35, which is shown in FIG. 7 equally in a broken line and thus is indicated only symbolically. With this second guiding element 35 the second line 22 can be guided at least in the region where it leads into the cartridge head 20. By this configuration of the lines 17 and 22 in an immediate vicinity of their regions leading into the cartridge head 20 in the area of the pivot axis B also minimized bending loads for these lines 17 and 22 can be realized. Moreover also particularly short line lengths can be realized. In an alternative embodiment it may be envisaged that the filter device 18 is for instance also installed on the door 10 and in this regard then is disposed to be correspondingly pivotable relative to the corner portion of the door. It may also be envisaged that in particular the filter cartridge 21 is at least partly covered by a further cover that is not shown. The filter device 18 can also be disposed in a further component of the household cooling appliance 1, such as for instance on a drawer or on a door rack.

The first distances A1 and A2 explained in the advantageous embodiments can be identical or different. Equally also the two distances B1 and B2 can be different. However, they can also be identical.

Preferably it may generally be envisaged that the first wall 26 of the carrier part 19 and the second wall 27 of the carrier part lead into each other. The first wall 26 of the carrier part 19 and the second wall 27 of the carrier part 19 in a preferred embodiment are disposed relative to each at an angle β of between 85° and 95°. The pivot axis B in a preferred embodiment is oriented at a first angle α1 smaller than 90° relative to the first wall 26 of the carrier part 19 and at a second angle α2 smaller than 90° relative to the second wall 27. In particular the pivoting device 29 in a preferred embodiment is configured in such a way that the cartridge head 20 is capable of being positioned in a first position and in a second position that is different therefrom relative to the carrier part 19, wherein the cartridge head 20 in this first position has a distance A1 from the first wall 26 of the carrier part 19 and a first distance A2 from the second wall 27 of the carrier part 19, and the cartridge head 20 in this second position has a second distance B1 from the first wall 26 of the carrier part 19 that is larger than the first distance A1 from the first wall 26 of the carrier part 19, and a second distance B2 from the second wall 27 of the carrier part 19 that is larger than the first distance A2 from the second wall 27 of the carrier part 19.

The pivoting device 29 in a preferred embodiment is configured in such a way that the cartridge head 20 in a first position and in a second position that is different therefrom is capable of being positioned relative to the carrier part 19, wherein the pivoting device 29 has a holding unit, with which the cartridge head 20 is held fixed in a first position and in a second position.

The filter device 18 in a preferred embodiment includes the filter cartridge 21, and the filter cartridge 21 is disposed in a non-destructively releasable way on the cartridge head 20 and in the disposed state is motion-coupled with the cartridge head 20.

On an inner side 26a of the first wall 26 of the carrier part 19 in a preferred embodiment a raised base 31 is formed, wherein the cartridge head 20 is disposed pivotably on this base 31.

On an inner side 27a of the second wall 27 of the carrier part 19 in a preferred embodiment a raised base 31 is formed, wherein the cartridge head 20 is disposed to be pivotable on this base 31.

The filter device 18 in a preferred embodiment includes a first liquid line 17, which leads into the cartridge head 20, and preferably includes a second liquid line that leads into the cartridge head 20.

The filter device 18 in a preferred embodiment has a first guiding element 34, with which the first line 17 is guided at least in the portion where it leads into the cartridge head 20.

The filter device 18 in a preferred embodiment includes a second guiding element 35, with which the second line 22 is guided at least in the region where it leads into the cartridge head 20.

The following is a summary list of reference numerals and the corresponding structure used in the above description of the invention:

1 household cooling appliance
2 housing
3 receiving space
4 inner container
5 bottom wall
6 rear wall
7 ceiling wall
8 side wall
9 side wall
10 door
11 beverage and/or ice dispenser unit
12 dispenser unit
13 front side
14 niche
15 water network
16 system
17 line
18 filter device
19 carrier part
20 cartridge head
21 filter cartridge
22 line
23 container
24 line
25 ice preparator
26 first wall
26a inner side
27 second wall
27a inner side
28 corner portion
29 pivoting device
30 rear wall
31 first base
32 second base
33 jacket wall
34 first guiding element
35 second guiding element
B pivot axis
C longitudinal axis
P arrow
α1 first angle
α2 second angle
A1 first distance
A2 first distance
B1 second distance
B2 second distance

The invention claimed is:

1. A filter device for filtering liquid for at least one of a beverage or ice dispenser unit of a household cooling appliance, the filter device comprising:
 a carrier part for attaching the filter device to a component of the household cooling appliance;
 the carrier part including a first wall;
 the carrier part including a second wall;
 the first wall of the carrier part and the second wall of the carrier part being inclined towards each other;
 a cartridge head configured for receiving a filter cartridge, the cartridge head being disposed on the carrier part;
 a pivoting device permitting the cartridge head to pivot about a pivot axis; and
 the pivot axis extending diagonally between the first wall and the second wall of the carrier part.

2. The filter device according to claim 1, wherein the first wall of the carrier part and the second wall of the carrier part lead into each other.

3. The filter device according to claim 1, wherein the first wall of the carrier part and the second wall of the carrier part are disposed relative to each other at an angle of between 85° and 95°.

4. The filter device according to claim 1, wherein the pivot axis is oriented at a first angle smaller than 90° relative to the first wall of carrier part and at a second angle smaller than 90° relative to the second wall.

5. The filter device according to claim 1, wherein the pivoting device is configured to permit the cartridge head to be positioned in a first position and in a second position being different than the first position relative to the carrier part;
 the cartridge head in the first position is disposed at a first distance from the first wall of the carrier part and a first distance from the second wall of the carrier part; and
 the cartridge head in the second position is disposed at a second distance being larger than the first distance from the first wall of the carrier part, and a second distance from the second wall of the carrier part being larger than the first distance from the second wall of the carrier part.

6. The filter device according to claim 1, wherein the pivoting device is configured to permit the cartridge head to be positioned in a first position and in a second position being different than the first position relative to the carrier part, and the pivoting device includes a holding unit by which the cartridge head is held discretely in the first position and discretely in the second position.

7. The filter device according to claim 1, wherein the filter device includes the filter cartridge, and the filter cartridge is disposed in a non-destructively releasable way on the cartridge head and in the state, in which it is disposed thereon, is motion-coupled with the cartridge head.

8. The filter device according to claim 1, wherein the carrier part includes a rear wall, in which the first wall and the second wall end.

9. The filter device according to claim 1, wherein a raised base is formed on an inner side of the first wall of the carrier part, and the cartridge head is disposed pivotably on the raised base.

10. The filter device according to claim 1, wherein a raised base is disposed on an inner side of the second wall of the carrier part, and the cartridge head is pivotably disposed on the raised base.

11. The filter device according to claim 1, wherein the filter device includes a first liquid line ending in the cartridge head, and a second liquid line ending in the cartridge head.

12. The filter device according to claim 11, wherein the filter device includes a first guiding element for guiding the first liquid line at least in a portion ending in the cartridge head.

13. The filter device according to claim 12, wherein the filter device includes a second guiding element for guiding the second liquid line at least in the portion ending in the cartridge head.

14. A filter device for filtering liquid for at least one of a beverage or ice dispenser unit of a household cooling appliance, the filter device comprising:
  a carrier part for attaching the filter device to a component of the household cooling appliance;
  the carrier part including a first wall configured to be in contact with a first wall of the component of the household cooling appliance;
  the carrier part including a second wall configured to be in contact with a second wall of the component of the household cooling appliance being different than the first wall of the component;
  the first wall of the carrier part and the second wall of the carrier part being inclined towards each other;
  a cartridge head configured for receiving a filter cartridge, the cartridge head being disposed on the carrier part;
  a pivoting device permitting the cartridge head to pivot about a pivot axis; and
  the pivot axis being oriented at a first angle being smaller than 90° relative to the first wall of the carrier part and at a second angle being smaller than 90° relative to the second wall of the carrier part.

15. The filter device according to claim 1, wherein:
  the pivoting device is configured to permit the cartridge head to be positioned in a first position and in a second position being different than the first position relative to the carrier part;
  the cartridge head in the first position is disposed at a first distance from the first wall of the carrier part and a first distance from the second wall of the carrier part; and
  the cartridge head in the second position is disposed at a second distance from the first wall of the carrier part being larger than the first distance from the first wall of the carrier part, and at a second distance from the second wall of the carrier part being larger than the first distance from the second wall of the carrier part.

16. A household cooling appliance, comprising:
  a housing defining a receiving space in the housing for food;
  an inner container including walls bounding the receiving space;
  two of the walls of the inner container ending at each other to form a corner portion;
  at least one of a beverage or ice dispenser unit configured for dispensing at least one of a beverage or ice form elements;
  a filter device configured for filtering a liquid for at least one of the beverage or ice dispenser unit to be supplied for generating at least one of the beverage or the ice form elements;
  the filter device including a cartridge head configured for receiving a filter cartridge;
  the cartridge head being pivotable about a pivot axis of the filter device;
  the filter device being disposed in the corner portion formed by the walls; and
  the pivot axis being disposed diagonally between the walls forming the corner portion.

17. A household cooling appliance, comprising:
  a housing defining a receiving space in the housing for food;
  an inner container including walls bounding the receiving space;
  at least one of a beverage or ice dispenser unit configured for dispensing at least one of a beverage or ice form elements;
  a filter device configured for filtering a liquid for at least one of the beverage or ice dispenser unit to be supplied for generating at least one of the beverage or the ice form elements;
  the filter device including a carrier part for attaching the filter device to at least one wall of the inner container;
  the carrier part including a first wall;
  the carrier part including a second wall;
  the first wall of the carrier part and the second wall of the carrier part being inclined towards each other;
  the filter device including a cartridge head configured to receive a filter cartridge, the cartridge head being disposed on the carrier part;
  the filter device including a pivoting device permitting the cartridge head to pivot about a pivot axis; and
  the pivot axis extending diagonally between the first wall of the carrier part and the second wall of the carrier part.

* * * * *